United States Patent
Johnson et al.

(10) Patent No.: US 6,251,269 B1
(45) Date of Patent: Jun. 26, 2001

(54) MODULAR FILTRATION SYSTEM HAVING REMOVABLE FILTER ELEMENT

(76) Inventors: Dennis J. Johnson, 1890 Red Leaf Ct., Windom, MN (US) 56101; Ronald P. Bloom, 1972 Hidden Valley La. NW., Miltona, MN (US) 56354

(*) Notice: Subject to any disclaimer, the term of this patent is extended or adjusted under 35 U.S.C. 154(b) by 0 days.

(21) Appl. No.: 09/271,500

(22) Filed: Mar. 18, 1999

(51) Int. Cl.⁷ .................................................. B01D 24/00
(52) U.S. Cl. ..................... 210/170; 210/284; 210/316; 210/320; 210/456; 405/52
(58) Field of Search .................... 210/238, 447, 210/170, 747, 284, 316, 320, 456, 289; 405/36, 43, 52

(56) References Cited

U.S. PATENT DOCUMENTS

| | | |
|---|---|---|
| 261,014 | 7/1882 | McLachlan . |
| 1,532,013 | 3/1925 | Winans . |
| 3,642,138 * | 2/1972 | Sheda ................................ 210/170 |
| 3,788,484 | 1/1974 | Godin ................................ 210/447 |
| 3,834,539 | 9/1974 | Thompson ......................... 210/167 |
| 4,124,511 | 11/1978 | Lay ..................................... 210/447 |
| 4,376,053 | 3/1983 | Bullock et al. .................... 210/767 |
| 4,495,072 | 1/1985 | Fields ................................ 210/238 |
| 4,507,072 | 3/1985 | Gaul, Jr. ........................... 210/236 |
| 4,539,718 | 9/1985 | Haer .................................. 210/435 |
| 4,582,605 | 4/1986 | Rea et al. .......................... 210/447 |
| 4,609,459 | 9/1986 | Hendrix ............................. 210/91 |
| 4,678,589 | 7/1987 | Ayres, Jr. .......................... 210/779 |
| 4,689,145 * | 8/1987 | Mathews et al. .................. 210/170 |
| 4,949,406 | 8/1990 | Canelli ............................... 210/447 |
| 4,992,181 * | 2/1991 | Siebert .............................. 210/744 |
| 4,996,725 | 3/1991 | Pino ................................... 210/447 |
| 5,027,447 | 7/1991 | Pino ................................... 210/445 |
| 5,174,897 * | 12/1992 | Wengrzynek ..................... 210/170 |
| 5,242,584 * | 9/1993 | Hoarau ............................. 210/170 |
| 5,397,462 | 3/1995 | Higashijima et al. ............ 210/136 |
| 5,498,334 | 3/1996 | Gneuss .............................. 210/236 |
| 5,788,409 * | 7/1998 | Johnson ............................ 210/170 |
| 5,823,711 * | 10/1998 | Herd et al. ........................ 405/36 |

\* cited by examiner

*Primary Examiner*—David A. Simmons
*Assistant Examiner*—Frank M. Lawrence
(74) *Attorney, Agent, or Firm*—Faegre & Benson

(57) ABSTRACT

A filtration system that is coupled to a fluid flow for creating a uniform horizontal fluid flow through the filtration system to remove impurities from the fluid flow. The filtration system includes a filter having an inlet region, an outlet region, and a filter housing fluidly coupled between the inlet region and the outlet region. The inlet region includes an inlet pipe and a mixing chamber for creating a uniform horizontal fluid flow through the filter. The filter housing includes a removable filter element that receives the uniform horizontal fluid flow and removes impurities from flow, and the outlet region discharges the flow from the filter. In one embodiment, the inlet pipe includes a planar discharge end that is angled with respect to the horizontal axis of the fluid, and the mixing chamber includes a closed end, which the fluid flow strikes as it exits the inlet pipe to create a uniform horizontal flow through the mixing chamber. Additional filters can be joined in-series to form a modular filtration system, with each individual filter including a filter element that removes a predetermined impurity from the fluid flow.

19 Claims, 4 Drawing Sheets

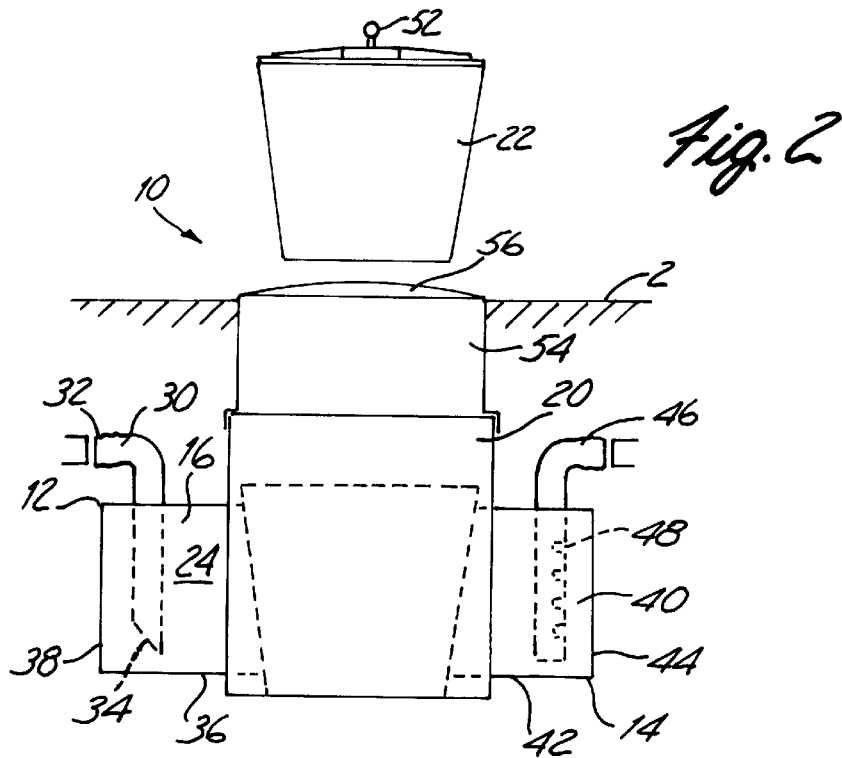
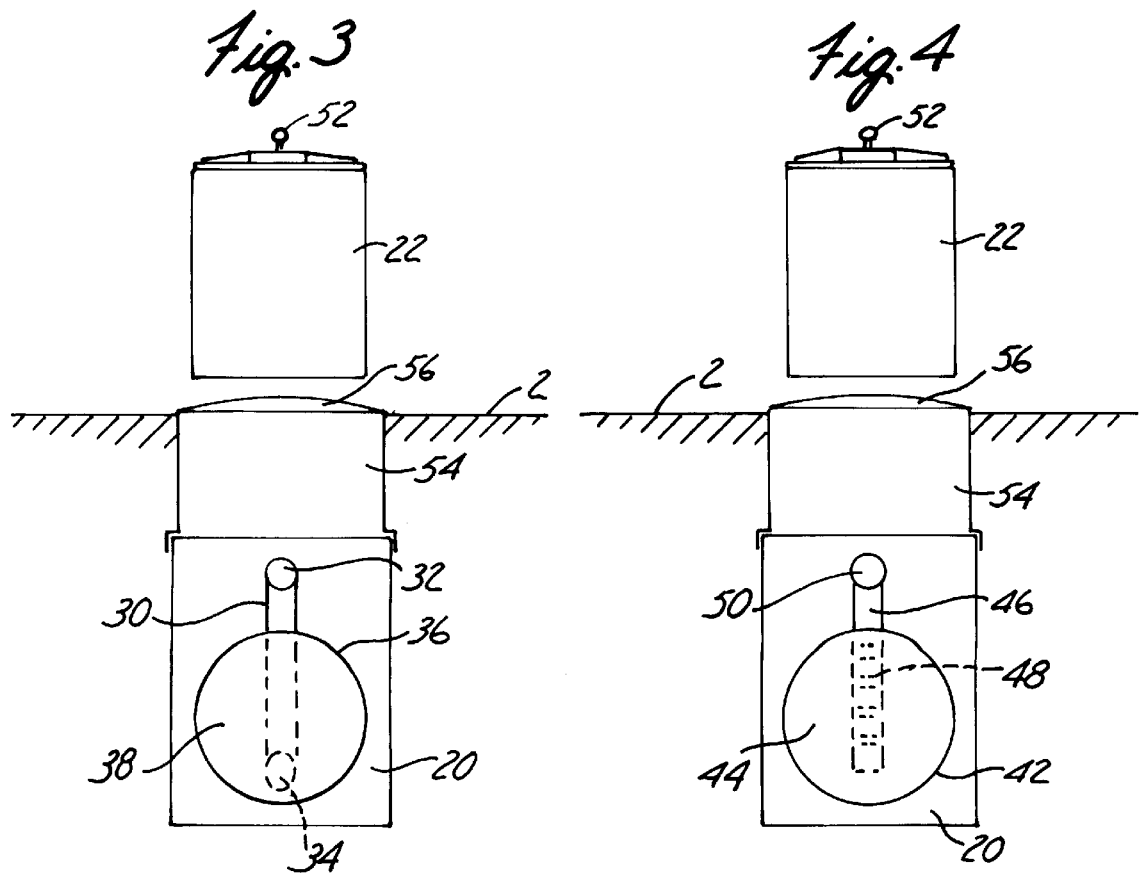

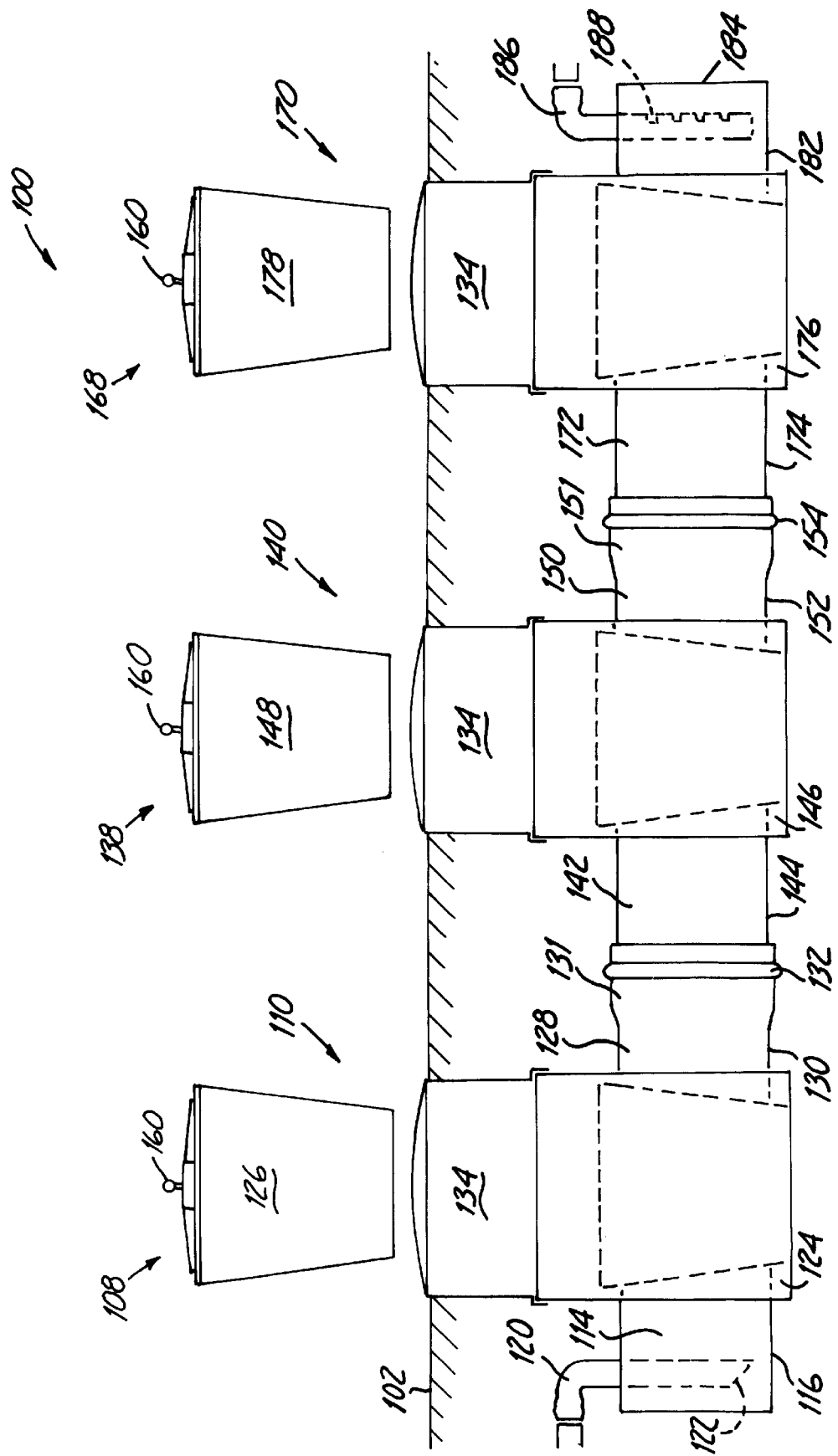

MODULAR FILTRATION SYSTEM HAVING REMOVABLE FILTER ELEMENT

TECHNICAL FIELD

The present invention relates generally to filters for removing impurities from a fluid flow. In particular, the invention is a modular filter system having a replaceable filter element for removing impurities from a generally horizontal fluid flow.

BACKGROUND OF THE INVENTION

Filters for removing impurities from a fluid flow are well known and are used in many applications. For example, filters are used to remove particles and bacteria from water to purify the water, thus making it suitable for drinking. Filters are also used to strain particulate from flows of other fluids, such as motor oil and milk. One example of a filter used to purify drinking water is shown in the Higashijima et al. patent, U.S. Pat. No. 5,397,462. The Higashijima et al. patent discloses a vertical water filter having a replaceable cartridge that removes impurities from a water supply. The filter is attached to a flow of water, which is forced vertically up into the cartridge and through a filter member. The water exits the filter at its top portion as a purified water supply suitable for drinking.

Another example of a water filter is shown in the Winans patent, U.S. Pat. No. 1,532,013. The Winans patent discloses a device for filtering rain water. The device has a wire screen positioned over a basket that contains a filtering material, such as charcoal. Rain water flows into the screen and the charcoal under normal gravitational forces. The screen removes large particles from the water flow, and the charcoal removes additional, smaller impurities from the rain water. The water then exits the bottom of the basket as a filtered water source.

Chemicals, such as fertilizers and weed killers, are in widespread use to promote the growth of crops and grass. Through normal ground water run off, these chemicals can seep into the subterranean water table. This problem is particularly evident in situations where a wide variety of chemicals are used to maintain a tract of land, such as at a golf course. Golf course groundskeepers typically use different types of fertilizers and weed killers to promote and maintain the health of fairways and greens. Because proper drainage is required to keep the course in shape for golfers, a tile system is often used to drain ground water from fairways and greens. The chemicals applied to the course, however, are also carried away by the ground water.

To prevent these chemicals from seeping into the subterranean water table, a filter can be used to remove the chemicals prior to discharging the excess ground water from the tile drain. These filters can be horizontal in nature, with fluid draining into and collecting at the filter under normal gravitational forces. Pressure from the water that collects at the filter forces the water through the filter. One shortcoming of filters of this type is that they typically only use a single filter element, which is thus capable of removing only a predetermined number and type of chemicals or impurities from the water supply. In addition, conventional horizontal filters make inefficient use of the filter element since the water flows primarily through the bottom half of the filter. As such, the bottom half of the filter element becomes clogged with impurities, thus necessitating replacement of the filter element, while the top half is still useable.

There is therefore a continuing need for an improved filter system. In particular, a filter system that creates and promotes a uniform horizontal fluid flow through a filter element is desirable to make more efficient use of the filter element. In addition, a filter system that permits more than one filter element to be used to remove a greater number of chemicals and impurities from a water supply is desirable. A filter system having removable filter elements is also highly desirable to permit the easy replacement of the filter elements after they become clogged with impurities.

SUMMARY OF THE INVENTION

The present invention is a filtration system for receiving a fluid flow to remove impurities from the fluid flow. The filtration system includes a first filter having an upstream end and a downstream end. The first filter comprises an inlet region at the upstream end of the filter, a mixing chamber for creating a generally horizontal fluid flow through the inlet region, a filter coupled to the inlet region for receiving the uniform horizontal fluid flow, and an outlet region at the downstream end of the filter. The inlet region of the filter is coupled to the fluid flow, and the mixing chamber receives the fluid flow at the inlet region of the filter. The filter housing is fluidly coupled to the inlet region for receiving the uniform horizontal fluid flow, and a filter element is positioned in the filter housing. The outlet region of the filter is coupled to the filter housing downstream of the filter housing, and receives the uniform horizontal fluid flow after it has passed through the filter element. The outlet region of the filter discharges the horizontal fluid flow from the filter.

In one embodiment, an input pipe extends into the mixing chamber to deliver the fluid flow source into the filter, and the mixing chamber at the upstream end of the filter is sized and shaped to create a substantially uniform horizontal flow. The input pipe has an inlet end that is coupled to the fluid flow and a planar discharge end through which the fluid flow exits into the mixing chamber. The planar discharge end of the input pipe is angled with respect to a horizontal axis of the filter.

In a second embodiment, the filtration system further includes a second filter having an upstream end and a downstream end. The second filter comprises an inlet region that is coupled to the outlet region of the first filter to receive the uniform horizontal fluid flow from the first filter, a filter housing fluidly coupled to the inlet region of the second filter, and an outlet region fluidly coupled to the filter housing of the second filter. The second filter receives the uniform horizontal flow from the first filter, and a filter element positioned in the filter housing of the second filter removes additional impurities from the horizontal fluid flow.

BRIEF DESCRIPTION OF THE DRAWINGS

FIG. 2 is a side view of the filtration system of FIG. 1 shown buried beneath the ground and shown with the filter element removed from the filter housing.

FIG. 3 is an end view of the filtration system of FIG. 2 as viewed from the inlet region of the filtration system.

FIG. 4 is an end view of the filtration system of FIG. 2 as viewed from the discharge region of the filtration system.

FIG. 6 is a side view of the modular filtration system of FIG. 5 shown in use buried beneath the ground with the filter elements of the upstream module, the intermediate module, and the downstream module removed from the filter housings of these modules.

DETAILED DESCRIPTION OF THE INVENTION

Figure 1:
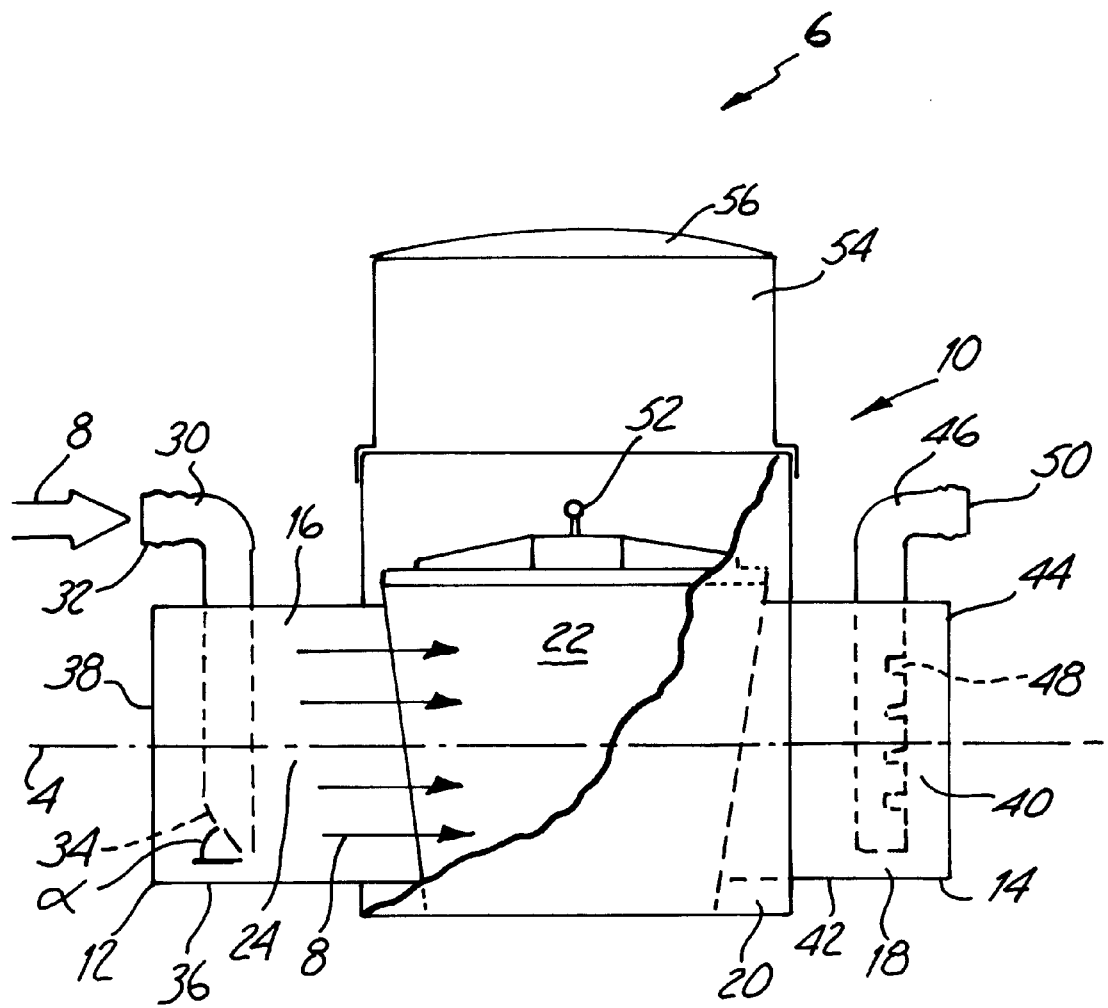
FIG. 1 is a side view of a filtration system in accordance with the present invention with portions broken away to illustrate the filter element of the filtration system.

A filtration system 6 having a filter 10 for removing impurities from a fluid flow 8 is shown in FIGS. 1–4. Filter 10 has an upstream end 12 that is adapted to receive fluid flow 8, and a downstream end 14 that is adapted to discharge fluid flow 8 from filter 10. Filter 10 further includes an inlet region 16 at upstream end 12, a filter housing 20 which is fluidly coupled to inlet region 16, and an outlet region 18 at downstream end 14 which is fluidly coupled to filter housing 20. A filter element 22 is positioned within filter housing 20 to receive and remove impurities from fluid flow 8. Fluid flow 8 flows into and through inlet region 16, into filter housing 20 and through element 22 where impurities are removed. Fluid flow 8 then exits filter element 22 and filter housing 20, and flows into the outlet region 18, where it is discharged from the filter 10.

Filter 10 creates a substantially horizontal fluid flow to remove impurities from the fluid that is preferably uniform across the fluid flow. That is, the inlet region 16 of filter 10 includes structure for receiving fluid flow 8, and for transforming fluid flow 8 into a flow that is substantially horizontal, and that is uniform in its chemical composition across the flow in a direction transverse to the direction of the flow. Specifically, inlet region 16 includes a mixing chamber 24 and an input pipe 30. Input pipe 30 includes an inlet end 32 that is fluidly coupled to flow 8, and a discharge end 34 (shown in phantom). One application for which the present invention is well suited is a ground water runoff system. where inlet end 32 of input pipe 30 is fluidly coupled to a tile drain for removing excess ground water. Such a tile drain is often used in golf courses to drain excess water from greens and fairways.

In the embodiment shown. mixing chamber 24 is comprised of a horizontally oriented cylindrical pipe 36 which is fluidly coupled to filter housing 20 and into which input pipe 30 extends. That is, input pipe 30 extends through cylindrical pipe 36, and is fixedly supported by cylindrical pipe 36 so that discharge end 34 of input pipe 30 extends into mixing chamber 24 to deliver fluid flow 8 into the mixing chamber 24. A seal can be created around input pipe 30 at the point where it extends through cylindrical pipe 36 to prevent leakage of unfiltered flow from filter 10.

In the embodiment shown in FIGS. 1 and 2, discharge end 34 of input pipe 30 is substantially planar, and the plane of discharge end 34 is oriented with respect to a horizontal axis 4 of filter 10 by an angle $\alpha$. Cylindrical pipe 36 includes a closed vertical end 38 at the upstream end 12 of filter 10, which in conjunction with the interior cross sectional shape of cylindrical pipe 36 defines mixing chamber 24. Mixing chamber 24 works in connection with input pipe 30 to create a substantially uniform fluid flow through filter 10. Specifically, fluid flow 8 enters input pipe 30 at inlet end 32 and exits input pipe 30 at discharge end 34. As it exits end 34, fluid flow 8 is directed to closed end 38 of mixing chamber 24 at an angle relative to horizontal axis 4. Fluid flow 8 strikes the closed end 38, rises vertically along the closed end 38, and flows in a downstream direction through filter 10. This interaction caused by the angled planar discharge end 34 and mixing chamber 24 creates a uniform horizontal fluid flow through the inlet region 16 of filter 10 (indicated in FIG. 1 by the plurality of arrows). The uniform horizontal fluid flow then enters the filter housing 20 and filter element 22.

Filter element 22 is comprised of a known, porous material that removes a predetermined impurity or chemical from the fluid flow 8. For example, an ion exchange resin can be used as filter element 22 to remove toxic chemicals from the fluid flow 8. Ion exchange resins are known, and are commercially available, such as through the Purolite Company of Philadelphia, Pa. Similarly, a charcoal filter element can be used to remove organic matter from the fluid flow. Other known filter elements can, of course, be used as required by the specific application in which the present invention is used. Filter element 22 is shaped to substantially conform the geometry of housing 20 to ensure the entire flow 8 passes through filter element 22.

After passing through filter element 22, the fluid flow 8 exits the filter housing 20, and enters the outlet region 18 of filter 10. Outlet region 18 is comprised of a discharge chamber 40 and. in the embodiment shown in FIGS. 1–4, an output pipe 46. Discharge chamber 40 is comprised of a horizontally oriented cylindrical pipe 42 fluidly coupled to housing 20 and having a vertical closed end 44 downstream at the end 14 of filter 10. Fluid flow 8 flows from the filter element 22 and filter housing 20 into cylindrical pipe 42 and contacts closed end 44. In this manner, a back wash flow is created where fluid flow 8 travels back upstream a small distance and contacts output pipe 46. Output pipe 46 includes a plurality of perforations 48, and the backwash flow created by closed end 44 enters the perforations 48. In the embodiment shown, perforations 48 are a plurality of horizontal slots form in output pipe 46. The fluid flows up the output pipe 46 and exits an outlet end 50 of output pipe 46. These horizontal slots increase the uniformity of collection of the fluid flow 8, although other structures for perforations 48, and other structures for receiving and discharging flow 8, can, or course, be used. For example, pipe 42 can be open at its discharge end to permit the filtered flow 8 to exit the filter 10. The filtered fluid 8 can be discharged into a drain field or other discharge area as is conventionally known.

In a preferred embodiment, filtration system 6 includes structure that permits the filter element 22 of filter 10 to be easily replaced when the filter element 22 has become to clogged with impurities. Toward this end, filter housing 20 preferably includes structure that permits access to the filter element 22. For example, filter housing 20 can include a hinged top (not shown) that opens up to permit the filter element 22 to be removed from housing 20. To facilitate its removal, filter element 22 can include an attachment structure 52 on a top portion of the filter element 22. In the embodiment shown in FIGS. 1–4, attachment structure 52 includes a loop, such as an eye bolt, which can be easily engaged by a hook (not shown) to lift filter element 22 from filter housing 20.

As previously mentioned, the present invention can be advantageously attached to a tile drain system buried beneath the ground to filter ground water runoff, and FIGS. 2–4 show filter 10 buried beneath ground 2. In order to permit access to filter element 22 in such an embodiment, however, filter 10 can include a housing extension 54 that is attached to filter housing 20. Housing extension 54 is sized so that a top portion 56 of housing extension 54 is at or slightly above the level of ground 2. Extension 54 can be integral with housing 20, or it can be separately formed and attached to housing 20 in a conventional manner, i.e. gluing with adhesive, or by fastening extension 54 to housing 20 with screws, nails, or the like. In such an arrangement, housing 20 permits access to the interior of housing 20 through extension 54, such as, for example, by being open at its top surface to extension 54 or by having a hinged opening at the top of filter housing 20 to permit access to filter housing 20 through housing extension 54. Top portion 56 can be hinged or otherwise removable, as is conventionally known, to permit filter element 22 to be removed through housing 20 and extension 54.

One subterranean application for which the present invention is particularly well suited is golf course drainage. In order to maintain the condition of fairways and greens on a golf course, groundskeepers typically use a wide variety of fertilizers and weed killers. A tile drain is often installed beneath the fairways and greens to drain excess water from these areas, and chemicals used to maintain the golf course seep into the water drained by the tile system. A filtration system in accordance with the present invention can be advantageously attached to the tile drainage system to treat the groundwater runoff to prevent the fertilizer and weed killer chemicals from entering an underground water supply in the manner described above.

In use as a golf course tile drain filter, for example, filter 10 is preferably comprised of components that are formed from a high density plastic, such as polyvinylchloride (PVC) or high density polyethylene (HDPE), a rigid metal, such as steel, or any other material having suitable structural characteristics. Specifically, the input pipe 30 of inlet region 16 is preferably formed from PVC or HDPE, and is cylindrical in nature having an outer diameter of a desired size sufficient to adequately receive fluid flow 8. Discharge end 34 of input pipe 30 is preferably angled 45 degrees from horizontal axis 4 of filter 10.

Cylindrical input pipe 36 of mixing chamber 24 and cylindrical output pipe 42 can be similarly formed from PVC or HDPE, and can have a diameter of any desired size. In one representative embodiment, pipe 36 and pipe 42 are 24 inches in diameter. The pipe 36 and pipe 42 can be sealed in fluid communication with filter housing 20 in a conventional manner, such as with a rubber gasket interposed between the pipes and the filter housing. A wire mesh with a geotextile backing can also be interposed between the pipe 36 and the filter housing 20 in a manner that completely covers the fluid couple between these components. Such a wire mesh can be used to filter particulate matter from the flow of fluid passing through the filter 10. A similar mesh can also be interposed at the fluid couple between pipe 42 and filter housing 20 if desired.

The filter housing 20 can be substantially square shaped or slightly tapered, and can also be formed from PVC or HDPE. In one embodiment, the filter housing is 36 inches in height and 34 inches in length and width at the bottom of housing 20. Preferred filter media for filter element 22 are activated charcoal or an ion exchange resin, such as is commercially available from the Purolite Corporation. An activated charcoal filter element can be used to remove organ compounds from the flow of fluid, such as pesticides, insecticides, and other petroleum based products. An ion exchange resin can be used to remove inorganic compounds, such as nitrates, sulfates, and other positive ions.

Cylindrical discharge pipe 46 is preferably formed from PVC or HDPE. and can have in inner diameter as desired to adequately permit fluid flow to exit filter 10. Housing extension 54 can be formed from PVC or HDPE. and is sized to fit on the filter housing 20 at its bottom end. The extension 54 can be substantially square or be slightly tapered. In one representative embodiment, the extension is twelve inches in height, and 36 inches in length and width at its top portion.

Figure 5:
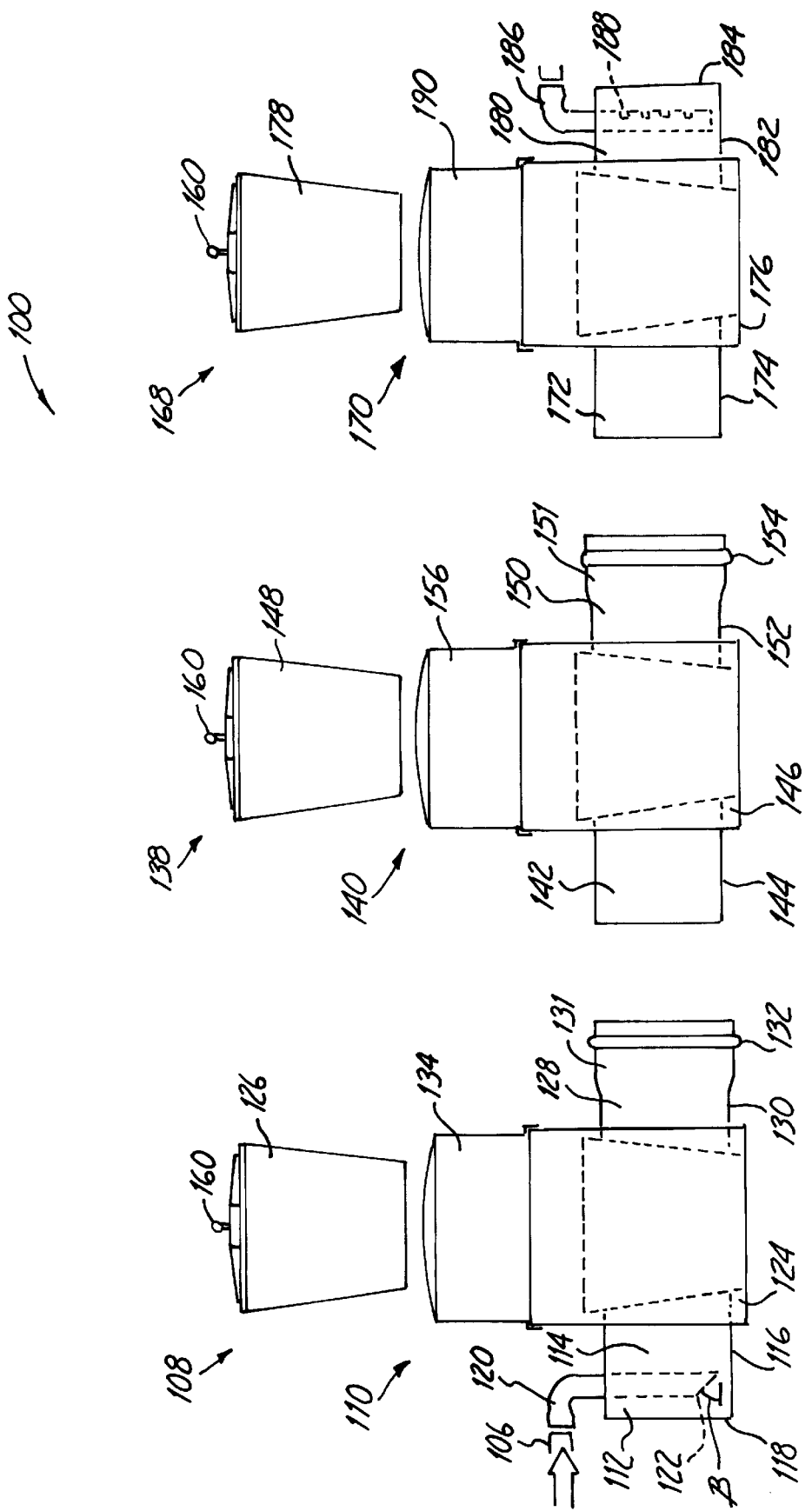
FIG. 5 is an exploded side view of a modular filtration system showing the upstream module, the intermediate module, and the downstream module of the filter system.

A second embodiment 100 of a filtration system in accordance with the present invention is shown in FIGS. 5 and 6. Specifically, FIG. 5 shows the individual modules of a modular filtration system 100 that is useful for removing a number of impurities from a fluid flow. As described above in the Background section, one of the shortcoming of conventional filters is that they are capable of removing only a specific type of impurity based on the type of filtration media used in the filter. Modular filtration system 100 overcomes this shortcoming in that is includes an upstream module 108, an intermediate module 138, and a downstream module 168, each of which can be used to remove a different type of impurity from a fluid flow.

Upstream module 108 of modular filtration system 100 is coupled to an external fluid flow 106, and includes an upstream filter 110. Intermediate module 138 includes an intermediate filter 140 and is fluidly coupled to the upstream filter 110. Downstream module 168 includes a downstream filter 170 and is fluidly coupled to intermediate filter 140. In this manner. upstream module 108, intermediate module 138, and downstream module 168 are connected in-series to form modular filtration system 100.

Upstream filter 110 of upstream module 108 includes many of the features of filter 10 described above and shown in FIGS. 1–4. Specifically, upstream filter 110 includes an inlet region 112 comprising a mixing chamber 114 and an input pipe 120. Mixing chamber 114 includes a horizontally oriented cylindrical pipe 116 having a vertical closed end 118 at an upstream end of upstream filter 110. Input pipe 120 includes a discharge end 122 that extends into mixing chamber 114, and discharge end 122 substantially lies in a plane that is angled with respect to the horizontal axis of the modular filtration system 100 by an angle β. In this manner, inlet region 112 is shaped to create a substantially uniform fluid flow through the inlet region 112. Upstream filter 110 further includes a filter housing 124 coupled to inlet region 112, and a removable filter element 126 positioned within filter housing 124 (shown removed from filter housing 124 for clarity). An outlet region 128 is fluidly coupled to filter housing 124 of upstream filter 110. In the embodiment shown, outlet region 128 is comprised of a cylindrical pipe 130. Upstream filter 110 receives and removes impurities from a fluid flow in a manner similar to that described above.

Intermediate filter 140 includes an inlet region 142 comprising a cylindrical pipe 144. Cylindrical pipe 144 is fluidly coupled with the cylindrical pipe 130 of the outlet region 128 of upstream filter 110 to receive the horizontal fluid flow discharged by the upstream module 108. Toward this end, the cylindrical pipe 130 of upstream filter 110 includes a flared region 131 that fits over the outer diameter of the cylindrical pipe 144 of the inlet region 142 of intermediate filter 140. A fluid seal between cylindrical pipe 130 and cylindrical pipe 144 can be created via conventional means, such as compression ring 132. Other sealing means can of course also be used. Pipe 130 and pipe 144 thus create a continuous passage for fluid flow 106.

Intermediate filter 140 further includes a filter housing 146 coupled to inlet region 142 to receive the fluid flow. A removable filter element 148 is positioned within filter housing 146 (shown removed from filter housing 146 for clarity) to remove additional impurities in the flow. Outlet region 150 is fluidly coupled to the filter housing 146 downstream of the filter housing 146 to receive the fluid flow after it passes through the filter element 148. Outlet region 150 is preferably comprised of cylindrical pipe 152.

Downstream filter 170 includes an inlet region 172 comprising a cylindrical pipe 174 that is fluidly coupled to cylindrical pipe 152 of outlet region 150 of intermediate filter 140. Toward this end cylindrical pipe 152 includes a flared region 151 that fits over the outer diameter of the cylindrical pipe 174 of inlet region 172 of downstream filter 170. Sealing means, such as a compression ring 154, can again be used to provide a fluid seal between cylindrical pipe 152 and cylindrical pipe 174 to create a continuous passage for fluid flow 106.

Downstream filter 170 further includes a filter housing 176 coupled to inlet region 172. A removable filter element 178 is positioned within filter housing 176 (shown removed from filter housing 176 for clarity) to remove impurities from the fluid flow. An outlet region 180 is fluidly coupled to filter housing 176 downstream of filter housing 176. Outlet region 180 is comprised of a cylindrical pipe 182 having a closed vertical end 184. As fluid flow passes through filter element 178 and into outlet region 180, the flow contacts closed vertical end 184 to create a backwash flow. This backwash flow enters perforations 188 of discharge pipe 186, and in this manner, the fluid flow exits the modular filtration system 100.

Similar to filter 10 described above and shown in FIGS. 1–4, one application for which modular filtration system 100 is particularly well suited is as a subterranean filtration system for draining a region of a golf course. Input pipe 120 of upstream filter 110 is attached to a tile drain that is positioned beneath the golf course to receive ground water from the golf course. Because modular filtration system 100 is buried beneath the ground, each of the upstream module 108, the intermediate module 138, and downstream module 168 further include a housing extension 134, 156, and 190, respectively, that can be attached to or be integral with filter housings 124, 146, and 176 to permit access to the respective filter housings. Specifically, upstream filter 110 includes housing extension 134 at a top portion of filter housing 124 and extending above the level of ground 102; intermediate filter 140 includes housing extension 156 at a top portion of filter housing 146; and downstream filter 170 includes housing extension 190 at a top portion of filter housing 176. Each of the housing extensions 134, 156, and 190 are sized so that a top portion of these housing extensions are at or slightly above ground level 102, and the top portions of these housing extensions are removable to provide access to the filter elements contained within the filter housings attached to the housing extensions. In this manner, the individual filter elements 126, 148, and 178 of the upstream, intermediate, and downstream modules, respectively, can be removed and replaced when the filter elements become clogged with impurities. An attachment structure 160 positioned at a top portion of the individual filter elements that facilitates the removal of the filter elements from the filter housings can also be included.

While the module filtration system 100 of FIGS. 5 and 6 includes three individual filtration modules that are connected in-series, additional filtration modules can of course be included. For example, additional intermediate modules having an intermediate filter 140 similar to that described above can be fluidly coupled in-series with the modules of the filtration system as needed. One particular advantage of a modular filtration system 100 is that a variety of filtration materials can be used in the individual filter elements to remove specific, predetermined chemicals and impurities from a fluid flow. For example, an ion exchange resin can be used as filter element 126 and as filter element 148 to remove nitrates and toxic chemicals from the fluid flow, while a charcoal material can be used as filter element 178 to remove organic material from the fluid flow. The resulting discharge from discharge pipe 186 is a purified water source. Such a modular filtration system permits a user to tailor the type of filtration activity that occurs to the individual chemicals and treatments applied to the land that is being drained.

A further advantage of a filtration system in accordance with the present invention is that the filter elements of these filters are more efficiently used, and thus will last longer. As described above in the Background section, conventional horizontal filters only make use of the bottom half of the filter, and once this becomes clogged, the filter element must be replaced, which results in one half of the filter element being wasted. Because the mixing chamber and the planar discharge end of the input pipe of the present invention create a uniform horizontal fluid flow, however, the entire filter element of the present invention is used to remove impurities from the fluid flow. As such, the impurities are not concentrated in the bottom half of the filter element, and the filter element enjoys a longer useful life as compared to conventional horizontal filters.

Although the present invention has been described with reference to preferred embodiments, those skilled in the art will recognize that changes can be made from the form and detail without departing from the spirit and scope of the invention.

What is claimed is:

1. A filtration system for receiving a fluid flow to remove impurities from the fluid flow, the filtration system including a first filter having an upstream end and a downstream end, the first filter comprising:

an inlet region at the upstream end of the filter, the inlet region adapted to receive the fluid flow;

a mixing chamber at the inlet region of the filter for creating a substantially horizontal fluid flow through the inlet region;

a filter housing fluidly coupled to the inlet region for receiving the uniform horizontal fluid flow;

a filter element positioned in the filter housing, the filter element receiving the uniform horizontal fluid flow from the inlet region;

an outlet region at the downstream end of the filter, the outlet region fluidly coupled to the filter housing for receiving the uniform horizontal fluid flow;

a discharge chamber at the outlet region having an end wall for creating a backwash flow as the uniform horizontal fluid flow strikes the end wall; and an outlet pipe extending into the discharge chamber and having a plurality of vertically spaced-apart openings for receiving the backwash flow.

2. The filtration system of claim 1, wherein the mixing chamber is sized and shaped to create a uniform horizontal flow, the filtration system further including an input pipe extending into the mixing chamber, the input pipe having an inlet end for receiving the fluid flow and a planar discharge end for discharging the fluid flow into the mixing chamber, the planar discharge end of the input pipe being angled with respect to the horizontal axis of the first filter.

3. The filtration system of claim 2, wherein the planar discharge end of the input pipe is angled by 45 degrees with respect to the horizontal axis of the first filter.

4. The filtration system of claim 2, wherein the mixing chamber includes:

a horizontal cylindrical pipe, the pipe extending toward and being coupled to the filter housing; and a closed vertical end at the upstream end of the first filter for creating a uniform horizontal fluid flow as the fluid flow exits the planar discharge end of the input pipe and strikes the closed vertical end.

5. The filtration system of claim 1, wherein:

the discharge chamber includes a cylindrical pipe and the end wall includes a closed vertical end at the downstream end of the first filter, the closed vertical end creating the backwash flow as the uniform horizontal fluid flow strikes the closed vertical end; and the openings of the output pipe face the closed vertical end of the cylindrical pipe of the discharge chamber for receiving the backwash flow.

6. The filtration system of claim 1 wherein the filter element includes activated carbon to remove organic matter from the uniform horizontal flow.

7. The filtration system of claim 1 wherein the filter element includes an ion exchange resin for removing inorganic chemicals from the uniform horizontal flow.

8. The filtration system of claim 1, wherein the filter element is removable from the filter housing.

9. The filtration system of claim 1, wherein the first filter is a subterranean filter buried beneath the ground and fluidly coupled to a tile system for receiving and filtering ground water run off.

10. The filtration system of claim 9 wherein the first filter further includes a housing extension positioned vertically above and connected to the filter housing, the extension having a top portion being at least level with the ground and having a removable top surface for exposing the filter housing and allowing access to the filter housing from above the ground.

11. The filtration system of claim 10 wherein the filter element is removable from the filter housing through the housing extension from above the ground.

12. The filtration system of claim 1, further including a second filter having an upstream end and a downstream end, the second filter comprising:

an inlet region at the upstream end of the second filter, the inlet region coupled to the outlet region of the first filter to receive the uniform horizontal flow from the first filter;

a filter housing fluidly coupled to the inlet region of the second filter for receiving the uniform horizontal flow;

a filter element positioned in the filter housing of the second filter, the filter element receiving the uniform horizontal flow from the inlet region; and an outlet region fluidly coupled to the filter housing of the second filter for receiving and discharging the uniform horizontal flow.

13. The filtration system of claim 12, wherein:

an activated carbon filter element is positioned in one of the filter element of the first filter and the filter element of the second filter for removing organic matter from the uniform horizontal flow; and an ion exchange resin filter element is positioned in the other one of the filter element of the first filter and the filter element of the second filter for removing toxic chemicals from the uniform horizontal flow.

14. A modular filter assembly coupled to an external fluid flow for removing impurities from the external fluid flow, comprising:

an upstream module coupled to the external fluid flow, the upstream module having an upstream filter and a mixing chamber for creating a uniform horizontal fluid flow through the upstream filter;

a downstream module having a downstream filter, an outlet region fluidly coupled to the filter for receiving the uniform horizontal fluid flow, a discharge chamber at the outlet region having an end wall for creating a backwash flow as the uniform horizontal fluid flow strikes the end wall, and an outlet pipe extending into the discharge chamber and having a plurality of vertically spaced-apart openings for receiving the backwash flow; and an intermediate module having an intermediate filter, the intermediate module being positioned and fluidly coupled between the upstream module and the downstream module, wherein the upstream filter, the intermediate filter, and the downstream filter receive and remove impurities from the external fluid flow.

15. The modular filter assembly of claim 14, wherein:

the upstream filter has an upstream end and a downstream end, the upstream filter comprising:

an upstream inlet region at the upstream end of the upstream filter, the upstream inlet region including the mixing chamber and coupled to the external fluid flow;

an upstream filter housing fluidly coupled to the upstream inlet region for receiving the uniform horizontal flow;

an upstream filter element positioned in the upstream filter housing, the upstream filter element receiving the uniform fluid flow and removing impurities from the flow; and a downstream region at the downstream end of the upstream filter, the downstream region fluidly coupled to the upstream filter housing for receiving the uniform fluid flow;

the intermediate filter comprises:

an upstream region fluidly coupled to the downstream region of the upstream filter, the upstream region of the intermediate filter receiving the uniform horizontal flow from the upstream filter;

an intermediate filter housing fluidly coupled to the upstream region of the intermediate filter;

an intermediate filter element in the intermediate filter housing, the intermediate filter element receiving the uniform horizontal flow from the upstream region of the intermediate filter and removing impurities from the flow; and a downstream region coupled to the intermediate fluid housing, the downstream region receiving the uniform horizontal flow from the intermediate filter element; and the downstream filter comprises:

an upstream region fluidly coupled to the downstream region of the intermediate filter, the upstream region receiving the uniform horizontal flow from the intermediate filter;

a downstream filter housing fluidly coupled to the upstream region;

a downstream filter element in the downstream filter housing, the downstream filter element receiving the uniform horizontal flow from the upstream region and removing impurities from the flow; and the discharge chamber is fluidly coupled to the downstream filter housing for receiving the uniform horizontal flow, and the uniform horizontal flow is discharged from the modular filter assembly through the outlet pipe.

16. The modular filter assembly of claim 15, wherein the modular filter assembly is a subterranean assembly buried below ground and fluidly coupled to a tile system to receive and remove impurities from ground water run off.

17. The modular filter assembly of claim 16, wherein a housing extension is positioned vertically above at least one of the upstream filter housing, the intermediate filter housing, and the downstream filter housing, the housing extension having a top portion being at least level with the ground and having a removable top surface for exposing the at least one filter housing and allowing access to the filter housing from above the ground.

18. The modular filter assembly of claim 17 wherein the filter element positioned in the filter housing is removable through the housing extension.

19. The modular filter assembly of claim 17, wherein the upstream filter, the intermediate filter, and the downstream filter each include a housing extension positioned vertically above the filter housing of the upstream filter, the intermediate filter, and the downstream filter, each of the housing extensions having a top portion at least level with the ground and having a removable top surface for exposing and allowing access to the filter housing upstream filter, the intermediate filter, and the downstream filter from above the ground.

* * * * *